United States Patent [19]
Hopkins

[11] 3,867,158
[45] Feb. 18, 1975

[54] SILICATE GLASS FROM BLAST FURNACE SLAG

[75] Inventor: John O. Hopkins, Pennington, N.J.

[73] Assignee: The Calumite Company, Trenton, N.J.

[22] Filed: Feb. 14, 1973

[21] Appl. No.: 332,254

Related U.S. Application Data

[63] Continuation-in-part of Ser. No. 288,382, Sept. 12, 1972.

[52] U.S. Cl.................... 106/51, 106/52, 106/73.6
[51] Int. Cl............................................. C03c 3/04
[58] Field of Search............ 106/51, 47 R, 73.6, 52

[56] References Cited
UNITED STATES PATENTS

| | | | |
|---|---|---|---|
| 558,370 | 4/1868 | Elbers | 106/51 |
| 1,962,270 | 5/1934 | Dunn | 106/51 |
| 3,677,728 | 7/1972 | Kitaigorodghy | 106/51 X |

FOREIGN PATENTS OR APPLICATIONS

| | | | |
|---|---|---|---|
| 199,368 | 8/1967 | U.S.S.R. | 106/51 |
| 760,031 | 10/1956 | Great Britain | 75/24 |
| 665,162 | 1/1965 | Belgium | 106/51 |
| 199,368 | 3/1967 | U.S.S.R. | 106/51 |

OTHER PUBLICATIONS

"Blast Furnace Slags in Glass Making," The Glass Industry, March 1935, p. 84.

*Primary Examiner*—Patrick P. Garvin
*Assistant Examiner*—John F. Niebling
*Attorney, Agent, or Firm*—Sperry and Zoda

[57] ABSTRACT

Glass and new glass-like products are provided which may have unique compositions and properties and are adapted for use in producing a wide variety of products which may be clear or transparent in color and capable of use in the manufacture of sheet materials, containers, fibers, glazes, and other ceramic articles. The compositions may be manufactured in a conventional glass furnace from a mixture of ingredients, the major portion of which may be a slag from which at least a portion of the sulfur and/or iron or both have been removed. The resulting products are glasses which may be composed primarily of the silicates of calcium, magnesium and aluminum or combinations thereof.

9 Claims, No Drawings

3,867,158

SILICATE GLASS FROM BLAST FURNACE SLAG

This application is a continuation-in-part of copending application Ser. No. 288,382 filed Sept. 12, 1972.

FIELD OF INVENTION

In the manufacture of glass it is usual to fuse sand or silica with fluxing agents such as alkalies and the oxides of calcium, magnesium, boron, lead, or the like. Additional agents which serve to improve the melting characteristics of the mix or which impart special properties or color to the glass being produced are also used in most operations.

The glass thus obtained ordinarily contains from about 50 to 75% or more of $SiO_2$ and from about 5 to 50% or more of alkali, boron, lead or other fluxing agents or combinations thereof. Boron and lead containing fluxing agents are relatively expensive. Moreover, the so-called "soda-glasses" generally melt at lower temperatures and require less fuel and lower furnace temperatures for fusion of the mix. However, glasses having a high alkali content generally have relatively high coefficients of expansion ranging from about 85 to 95 $\times 10^{-7}$ and therefore tend to fracture readily. They also are less durable and have rather poor weathering properties as compared with those glasses having a high boron or lead content.

It has been suggested heretofore that blast furnace slag and other slags may be used in varying amounts in the manufacture of glass as exemplified by U.S. Pat. No. Re. 26,238; British Pat. No. 1,141,525 and copending application Ser. No. 232,946 filed Mar. 8, 1972 now abandoned. However, the amount and type of such slags employed and the type of glass produced have been limited and controlled by the presence of iron and/or sulfur contained in the slag in such manufacturing operation. Thus when producing clear, colorless or flint glass it is not generally possible to include more than about 5 or 6% of blast furnace slag in the mixture of glass forming materials because of the presence of significant amounts of iron and sulfur in the slag. When producing colored glasses larger amounts of slag may be used and it is sometimes possible to add up to 20% by weight of slag based on the weight of the sand to the glass forming mix.

In said copending application Ser. No. 288,382, a method has been disclosed whereby the amount of sulfur and/or iron or both contained in slags can be reduced so as to obtain refined slags as new products which are composed in large measure of the silicates of calcium, magnesium, and aluminum or combinations of such silicates.

It has now been found that a whole range of glass products having desirable properties and compositions can be produced easily and economically when using relatively large amounts or refined slag in the glass forming mix. The slag preferably is refined to reduce the sulfur content thereof to less than about 0.3% and the sulfur may be reduced to 0.03% or less if desired. The refined slag may also be treated to reduce its iron content to about 0.3% or less. In general the lower the amount of sulfur present in the refined slag the greater the amount of such slag which can be used in the glass forming mix. At the same time the larger the amount or refined slag used the faster the mix will melt, the lower its fusion point and the less fuel or heat required to produce the glass. Moreover, the temperature of the stack gases from the furnace and the heat loss is reduced while the amount of noxious gases discharged into the atmosphere is decreased.

It is possible to use substantial amounts of such refined slags in the manufacture of clear and colored glasses and glass products having the usual or conventional composition and properties. On the other hand, it is also possible to produce new types of glass products which have unique properties and compositions. The refined slag may be used in amounts ranging from say about 2 to 5% up to 500% based on the weight of the sand in the mix. It may also be used in combination with untreated slags of known compositions in formulating a glass forming mix.

Various materials such as gypsum, barytes and other $SO_2$ releasing compounds as well as carbonates such as soda ash, limestone, and the like, may also be used in formulating the mixture of glass making materials. Coloring agents, decolorants and other conventional additives employed in glass manufacturing processes may also be used.

Furthermore, it is actually possible in accordance with the present invention to produce glass products from mixtures which consist almost entirely of materials that are waste or recycled products such as slag, recycled glass or cullet and incinerator sand and slags formed as waste materials in the disposal of garbage, trash, and the like.

Those glasses produced when using up to about 20% by weight of refined slag may have substantially conventional compositions and properties whereas the use of more than about 20% of refined slag in the glass making mix imparts new properties to the glass and may result in significant changes in composition. Thus, for example, when using a greater amount of refined slag than sand in the glass forming mix the resulting glass is characterized by a relatively low $SiO_2$ content and a relatively high amount of the oxides of aluminum, calcium, and magnesium. At the same time such glasses may be low in its alkali content — that is, they may contain less than 5% of alkali and little or no borates or lead at all. They also are more durable and have better weathering properties than conventional glass. They generally also have relatively low coefficients of expansion — that is, below about 80 $\times 10^{-7}$ and may be either clear or colored as desired.

The refined slags employed in the practice of the present invention are preferably produced in accordance with the process described in copending application Ser. No. 288,382. They are generally blast furnace slags which have been treated to reduce the amount of sulfur present in the slag to less than 0.3% and preferably to about 0.03% or less. They may also be treated to reduce the amount of iron present in the slag to less than 0.3%.

Typical refined slags which may be used have the following compositions:

TABLE I

|  | A | B | C |
|---|---|---|---|
| $SiO_2$ | 33.0 | 39.7 | 32.9 |
| $Al_2O_3$ | 16.5 | 7.5 | 16.4 |
| CaO | 31.8 | 38.2 | 31.7 |
| $Fe_2O_3$ | 0.08 | 0.08 | 0.3 |
| MgO | 18.0 | 13.56 | 18.0 |
| $Na_2O + K_2O$ | 0.6 | 0.81 | 0.6 |
| Sulfur | Nil | 0.15 | Nil |

EXAMPLE I

A novel type of glass product was obtained by using the refined slag A of Table I in a mixture of the following materials in parts by weight:

| | |
|---|---|
| Refined Slag A | 2000 |
| Sand | 326 |
| Gypsum | 326 |

This mixture was fused in a glass furnace at about 2400°F to 2600°F whereby a glass product was obtained having the following composition:

| | |
|---|---|
| $SiO_2$ | 40.6 |
| $Al_2O_3$ | 13.4 |
| $CaO$ | 30.4 |
| $MgO$ | 14.8 |
| $SO_3$ | 0.24 |
| $Fe_2O_3$ | 0.5 |
| $Na_2O + K_2O$ | 0.5 |

A clear, bright glass was obtained having the following properties:

| | |
|---|---|
| Coefficient of Expansion | $65.55 \times 10^{-7}$ |
| Density | 2.8106 |
| Gob Point | 1934°F |
| Softening Point | 1583°F |
| Annealing Point | 1426°F |
| Working Range | 351°F |

The firing time or duration of the mix in the furnace is reduced, presumably due to the previous fluxing of the silica in the slag during formation of the slag used in the process. As a result the volume output of the furnace can be increased. Moreover, the relatively high softening point and limited working range of the glass render it possible and desirable to form articles from the glass more rapidly than heretofore whereby the forming machinery used can be operated at greater speed and a higher product output attained. It will also be noted that a high grade glass is produced without resorting to the use of soda ash and other expensive additives.

EXAMPLE II

A refined slag having the composition C of Table I from which the major portion of the sulfur had been removed without reducing its iron content was used in producing glass in accordance with the present invention.

This slag was mixed with sand and gypsum in the following proportions:

| | | |
|---|---|---|
| Refined Slag C | 2000 | parts by weight |
| Sand | 326 | do. |
| Gypsum | 326 | do. |

The mixture was fused as in Example I whereby a light green glass was obtained having the following composition:

| | |
|---|---|
| $SiO_2$ | 40.5 |
| $Al_2O_3$ | 13.4 |
| $CaO$ | 30.3 |
| $MgO$ | 14.8 |
| $Fe_2O_3$ | 0.24 |
| $SO_3$ | 0.26 |
| Alkali | 0.5 |

The physical properties of the glass were essentially the same as those of the glass produced in accordance with Example I above.

EXAMPLE III

An emerald green glass was produced using the refined slag A of Table I in the following mixture in parts by weight:

| | |
|---|---|
| Sand | 2000 |
| Refined Slag A | 2000 |
| Gypsum | 326 |
| Iron Chromite | 16 |

The mixture was melted in a glass furnace at 2400°F to 2600°F and had the following composition:

| | |
|---|---|
| $SiO_2$ | 64.08% |
| $Al_2O_3$ | 7.55% |
| $Fe_2O_3$ | 0.16% |
| $CaO$ | 20.03% |
| $MgO$ | 7.49% |
| $Na_2O + K_2O$ | 0.30% |
| $SO_3$ | 0.20% |
| $CrO_3$ | 0.18% |

The glass had the following properties:

| | |
|---|---|
| Coefficient of Expansion | $46.83 \times 10^{-7}$ |
| Density | 2.5596 |
| Gob Point | 2402°F |
| Softening Point | 1623°F |
| Annealing Point | 1301°F |
| Working Range | 779°F |

EXAMPLE IV

A rather conventional clear, flint glass was produced using the refined slag A of Table I by preparing a mixture having the following:

| | |
|---|---|
| Sand | 2000 |
| Refined Slag A | 266 |
| Soda Ash | 696 |
| Limestone | 323 |
| Barytes | 25 |

This mixture was melted in a glass furnace at 2600°F to 2800°F whereby a clear glass was produced having the following composition:

| | |
|---|---|
| $SiO_2$ | 72.9% |
| $Al_2O_3$ | 1.5% |
| $CaO$ | 9.16% |
| $MgO$ | 1.4% |
| $SO_3$ | 0.2 |
| $BaO$ | 0.6% |
| Alkali | 14.2% |
| $Fe_2O_3$ | .04% |

The physical properties of this glass were as follows:

| | |
|---|---|
| Coefficient of Expansion | $86.91 \times 10^{-7}$ |
| Density | 2.4974 |
| Gob Point | 2206°F |
| Softening Point | 1339°F |
| Annealing Point | 1019°F |
| Working Range | 867°F |

This glass can be handled and worked in much the same manner as conventional flint glass and can be used in the manufacture of sheets, containers, and other conventional glass products.

EXAMPLE V

The refined slag B of Table I was used in combination with boiler slag and "Calumite" slag in the manufacture of an amber glass. The boiler slag had the following composition:

| | |
|---|---|
| $SiO_2$ | 42.66 |
| $Al_2O_3$ | 20.97 |
| FeO | 23.05 |
| $Fe_2O_3$ | 4.45 |
| Carbon | 0.06 |
| $SiO_2$ | 0.95 |
| Phosphorous | 0.11 |
| Manganese | 0.04 |
| CaO | 6.41 |
| MgO | 1.11 |
| Sulfate Sulfur | 0.15 |
| Moisture | 0.04 | and the Calumite slag had the following composition:

| | |
|---|---|
| $SiO_2$ | 32.3 |
| $Al_2O_3$ | 16.1 |
| CaO | 31.1 |
| MgO | 17.7 |
| $Fe_2O_3$ | 0.3 |
| MnO | 0.1 |
| $Na_2O + K_2O$ | 0.6 |
| Sulfur | 0.9 |
| Carbon | 0.5 |

The glass forming mix was prepared using the following materials in parts by weight:

| | |
|---|---|
| Sand | 2000 |
| Soda Ash | 751 |
| Boiler Slag | 21 |
| Calumite Slag | 200 |
| Refined Slag B | 231 |
| Limestone | 213 |

This mixture was melted in a glass furnace at 2600°F to 2800°F whereby an amber glass having the following composition was obtained:

| | |
|---|---|
| $SiO_2$ | 71.36 |
| $Al_2O_3$ | 2.46 |
| $Fe_2O_3$ | 0.24 |
| CaO | 9.02 |
| MgO | 2.27 |
| $Na_2O + K_2O$ | 14.60 |
| Sulfur | 0.03 |

The glass had the following properties:

| | |
|---|---|
| Coefficient of Expansion | $85.9 \times 10^{-7}$ |
| Density | 2.5074 |
| Gob Point | 2217°F |
| Softening Point | 1335°F |
| Annealing Point | 1020°F |
| Working Range | 882°F |

Such glass may be used in the manufacture of bottles, sheets, fibers and other conventional glass products.

In each of the foregoing examples the products obtained are adapted for use in manufacturing a wide range of products of either conventional or special types. Thus where a glass having a coefficient of expansion below about $75 \times 10^{-7}$ and an $SiO_2$ content below about 60% is desired the glass making mix may contain a major proportion of refined slag and a minor proportion of sand. At the same time it is possible to produce glass products containing little or no alkali, boron lead, or the like, when necessary. When conventional types of clear or colorless glass products are desired mixes which are otherwise generally conventional but containing refined slags in amounts varying from 2 to 5% and up to 20% based on the weight of the sand in the mix can be used. When colored glass is to be produced, glass making mixes which are otherwise substantially conventional but contain from about 10 to 40% refined slag may be employed.

In any event, the presence of the refined slag aids in the refining of the molten glass reducing the amount of seeds and blisters produced and increasing the stability of the glass. Moreover, the through-put or yield of the glass furnace can be increased and the temperature of the furnace may often be reduced by an amount varying from 100°F to 600°F, and erosion of the furnace refractories can be reduced.

While typical formulations and procedures embodying the present invention have been cited above, it should be understood that they are intended to be illustrative only and are not intended to limit the scope of the invention.

I claim:

1. The method of producing a transparent glass which consists melting a mixture of glass forming materials consisting essentially of sand, from about 20% to 500% of refined slag based upon the weight of the sand in the mixture, and from about 16 to 100% based on the weight of the sand in the mixture of an agent selected from the group consisting of the sulfates and carbonates of sodium and calcium and mixtures thereof, said refined slag being a blast furnace slag containing less than 0.3% by weight of sulfur.

2. The method as defined in claim 1 wherein said mixture of a glass forming materials also includes slag compositions other than said refined slag.

3. The method as defined in claim 1 wherein said mixture contains a sulfate selected from the group consisting of gypsum, barytes and salt cake.

4. The method as defined in claim 1 wherein said mixture contains an amount of a sulfate compound substantially equal to the weight of the sand in the mixture.

5. The method as defined in claim 1 wherein said mixture consists essentially of about 2000 parts by weight of refined slag, about 326 parts by weight of sand and about 326 parts by weight of gypsum.

6. The method as defined in claim 1 wherein said refined slag contains about 0.03% or less of sulfur and about 0.3% or less of iron.

7. A transparent glass product resulting from the fusion in a glass furnace of a mixture of glass forming materials consisting essentially of sand, from about 20% to 500% based on the weight of the sand of blast furnace slag containing less than 0.3% sulfur, and from about 16% to 100% based on the weight of the sand of an agent selected from the group consisting of the sulfates and carbonates of sodium and calcium and mixtures thereof, said glass product having a $SiO_2$ content not exceeding about 50% and an alkali content not exceeding about 5%, and having a coefficient of expansion less than $80 \times 10^{-7}$ 8. A glass product as defined in claim 7 having an $SiO_2$ content of less than 50%.

9. A glass product as defined in claim 7 which contains substantially no lead or boron.

* * * * *